US012306013B2

(12) United States Patent
Brown (10) Patent No.: US 12,306,013 B2
(45) Date of Patent: May 20, 2025

(54) FLIGHT CONSTRAINTS SERVICE

(71) Applicant: The Boeing Company, Chicago, IL (US)

(72) Inventor: Jonathan M. Brown, Parker, CO (US)

(73) Assignee: THE BOEING COMPANY, Chicago, IL (US)

( * ) Notice: Subject to any disclaimer, the term of this patent is extended or adjusted under 35 U.S.C. 154(b) by 290 days.

(21) Appl. No.: 17/982,026

(22) Filed: Nov. 7, 2022

(65) Prior Publication Data

US 2024/0151552 A1 May 9, 2024

(51) Int. Cl.
*G05D 1/00* (2024.01)
*G01C 21/00* (2006.01)

(52) U.S. Cl.
CPC ....... *G01C 21/3874* (2020.08); *G01C 21/005* (2013.01)

(58) Field of Classification Search
CPC .................................................. G08G 5/0013
See application file for complete search history.

(56) References Cited

U.S. PATENT DOCUMENTS

| | | | | |
|---|---|---|---|---|
| 5,590,308 | A * | 12/1996 | Shih | G06F 12/0811 |
| | | | | 711/E12.024 |
| 8,862,976 | B1 * | 10/2014 | Fishkin | G06F 40/106 |
| | | | | 715/204 |
| 9,558,670 | B1 * | 1/2017 | Sheth | G08G 5/006 |
| 2004/0230552 | A1 * | 11/2004 | Smith | G06F 16/2322 |
| 2018/0084049 | A1 * | 3/2018 | Wu | H04M 15/41 |
| 2020/0200553 | A1 * | 6/2020 | Voznesensky | B60W 40/06 |
| 2020/0279003 | A1 * | 9/2020 | Dupont | G06F 16/1744 |
| 2020/0363781 | A1 * | 11/2020 | Mangels | G05B 19/4185 |
| 2021/0105304 | A1 * | 4/2021 | Kraning | G06Q 10/08 |
| 2021/0183255 | A1 * | 6/2021 | Van Tulder | G08G 5/0013 |
| 2021/0293573 | A1 * | 9/2021 | Sofman | G01C 21/3469 |
| 2022/0057227 | A1 * | 2/2022 | Koenig | G06F 3/0485 |

OTHER PUBLICATIONS

Daly, M. et al., "RFC7946—The GeoJSON format", Aug. 1, 2016, pp. 1-28, XP093144624, Retrieved from: https://www.rfc-editor.org/rfc/pdfrfc/rfc7946.txt.pdf.

* cited by examiner

*Primary Examiner* — Redhwan K Mawari
*Assistant Examiner* — Paul W Arellano
(74) *Attorney, Agent, or Firm* — Philip S. Hof; The Small Patent Law Group LLC

(57) ABSTRACT

A method for flight constraints service includes receiving data items at a first computer, transforming the data items into formatted items, transforming metadata items associated with constraints into the formatted items, storing the formatted items in a database, receiving a request at the first computer to view a requested formatted item, generating a geospatial data interchange format file from the requested formatted item, transferring the geospatial data interchange format file from the first computer to a second computer, creating a visual presentation of the geospatial data interchange format file with the second computer, and presenting the visual presentation in a human-readable format at an output device. The data items have multiple data types. The formatted items includes multiple constraints. The constraints include multiple first constraints and multiple second constraints. The metadata items include at least two among effectivity, versioning, timestamps, source, and operational state of the constraints.

18 Claims, 7 Drawing Sheets

FLIGHT CONSTRAINTS SERVICE

TECHNICAL FIELD

The disclosure relates generally to flight planning, and in particular, to flight constraints service.

BACKGROUND

In the aviation field, some existing flight planning rules are automatically created while other rules are manually entered into text files. Such entries involve complex and slow processes to support flight planning and data optimization services. To date, the European airspace has been fully completed, allowing an optimizer to calculate valid flight plans based on airspace restrictions.

Accordingly, those skilled in the art continue with research and development efforts in the field of flight constraint services for flight planning purposes.

SUMMARY

A method for flight constraints service is provided herein. The method includes receiving at a first computer a plurality of data items. The plurality of data items have a plurality of data types, and the plurality of data items are useful in generating a plurality of flight plans. The method includes transforming the plurality of data items into a plurality of formatted items. The plurality of formatted items includes a plurality of constraints. The plurality of constraints include a plurality of first constraints and a plurality of second constraints. Each of the plurality of first constraints has one of a Boolean true designation and a Boolean false designation. Each of the plurality of second constraints is a variable cost that ranges from an avoidance cost to an inclusion cost. The method further includes transforming a plurality of metadata items associated with the plurality of constraints into the plurality of formatted items. The metadata items include at least two among effectivity, versioning, timestamps, source, and operational state of the plurality of constraints. The method includes storing the plurality of formatted items in a database in communication with the first computer, receiving a request at the first computer to view a requested formatted item of the plurality of formatted items, generating a geospatial data interchange format file from the requested formatted item, transferring the geospatial data interchange format file from the first computer to a second computer, creating a visual presentation of the geospatial data interchange format file with the second computer, and presenting the visual presentation in a human-readable format at an output device in communication with the second computer.

In one or more embodiments, the method includes receiving one or more manual data items from an input device at the first computer, transforming the one or more manual data items into additional ones of the plurality of formatted items, and storing the additional ones of the plurality of formatted items in the database.

In one or more embodiments, the method includes transferring a subset of the plurality of first constraints from the first computer to a third computer, and generating a particular flight plan with the third computer in response to the subset of the plurality of first constraints aside from the first constraints with the Boolean false designation.

In one or more embodiments of the method, the first constraints with the Boolean false designation are not utilized to determine one or more of a route limitation and an aircraft limitation.

In one or more embodiments, the method includes adding a state to each of the plurality of formatted items at a corresponding creation time, and retiring each of the plurality of formatted items a corresponding period after the corresponding creation time.

In one or more embodiments, the method includes updating the state of one or more of the plurality of formatted items prior to retirement, and adding a conditional statement to each of the plurality of formatted items that is updated.

In one or more embodiments, the method includes transferring a subset of the plurality of formatted items from the first computer to a third computer, and validating the conditional statement of each formatted item in the subset of formatted items against the state and a corresponding data type of the plurality of data types using the third computer.

In one or more embodiments, the method includes generating a human-readable report in response to a failure to transform a particular data item of the plurality of data items into a particular formatted item of the plurality of formatted items.

In one or more embodiments of the method, the plurality of formatted items are compatible with a Jeppesen flight planning and dispatch tool.

A system is provided herein. The system includes a first computer, a second computer and an output device. The first computer is operational to receive a plurality of data items. The plurality of data items have a plurality of data types, and the plurality of data items are useful in generating a plurality of flight plans. The first computer is operational to transform the plurality of data items into a plurality of formatted items. The plurality of formatted items includes a plurality of constraints. The plurality of constraints include a plurality of first constraints and a plurality of second constraints. Each of the plurality of first constraints has one of a Boolean true designation and a Boolean false designation. Each of the plurality of second constraints is a variable cost that ranges from an avoidance cost to an inclusion cost. The first computer is further operational to transform a plurality of metadata items associated with the plurality of constraints into the plurality of formatted items. The metadata items include at least two among effectivity, versioning, timestamps, source, and operational state of the plurality of constraints. The first computer is operational to store the plurality of formatted items in a database in communication with the first computer, generate a geospatial data interchange format file from a requested formatted item of the plurality of formatted items. and transfer the geospatial data interchange format file. The second computer is in communication with the first computer and is operational to send a request to the first computer to view the requested formatted item, and create a visual presentation of the geospatial data interchange format file. The output device is in communication with the second computer and is operational to present the visual presentation in a human-readable format.

In one or more embodiments, the system includes an input device operational to present one or more manual data items to the first computer. The first computer is further operational to transform the one or more manual data items into additional ones of the plurality of formatted items, and store the additional ones of the plurality of formatted items in the database.

In one or more embodiments, the system includes a third computer in communication with the first computer and operational to receive a subset of the plurality of first constraints from the first computer, and generate a particular flight plan in response to the subset of the plurality of first constraints aside from the first constraints with the Boolean false designation.

In one or more embodiments of the system, the first constraints with the Boolean false designation are not utilized to determine one or more of a route limitation and an aircraft limitation.

In one or more embodiments of the system, the first computer is further operational to add a state to each of the plurality of formatted items at a corresponding creation time, and retire each of the plurality of formatted items a corresponding period after the corresponding creation time.

In one or more embodiments of the system, the first computer is further operational to update the state of one or more of the plurality of formatted items prior to retirement, and add a conditional statement to each of the plurality of formatted items that is updated.

In one or more embodiments, the system further includes a third computer in communication with the first computer and operational to receive a subset of the plurality of formatted items from the first computer, and validate the conditional statement of each formatted item in the subset of formatted items against the state and a corresponding data type of the plurality of data types.

In one or more embodiments of the system, the first computer is further operational to generate a human-readable report in response to a failure to transform a particular data item of the plurality of data items into a particular formatted item of the plurality of data items.

In one or more embodiments of the system, the plurality of formatted items are compatible with a Jeppesen flight planning and dispatch tool.

In one or more embodiments of the system, the plurality of data types includes airman meteorological information, significant meteorological information, notice to air missions, airport advisories, mandatory routes, airway restrictions, airspace use plans, code departure routes, en route automation modernization, and extended range aerial delivery system.

A non-transitory computer readable storage media containing processor executable instructions is provided herein, The processor executable instructions cause a processor to perform the step of receiving a plurality of data items. The plurality of data items have a plurality of data types, and the plurality of data items are useful in generating a plurality of flight plans. The processor further performs the step of transforming the plurality of data items into a plurality of formatted items. The plurality of formatted items includes a plurality of constraints. The plurality of constraints include a plurality of first constraints and a plurality of second constraints. Each of the plurality of first constraints has one of a Boolean true designation and a Boolean false designation. Each of the plurality of second constraints is a variable cost that ranges from an avoidance cost to an inclusion cost. The processor further performs the step of transforming a plurality of metadata items associated with the plurality of constraints into the plurality of formatted items. The metadata items include at least two among effectivity, versioning, timestamps, source, and operational state of the plurality of constraints. The processor further performs the steps of storing the plurality of formatted items, receiving a request to view a requested formatted item of the plurality of formatted items, generating a geospatial data interchange format file from the requested formatted item, creating a visual presentation of the geospatial data interchange format file, and presenting the visual presentation in a human-readable format to an output device.

The above features and advantages, and other features and advantages of the present disclosure are readily apparent from the following detailed description of the best modes for carrying out the disclosure when taken in connection with the accompanying drawings.

DETAILED DESCRIPTION

Various embodiments of the disclosure generally provide a system and method for a flight constraints service that incorporates multiple computers and multiple data sources. The data sources store data items useful in generating flight plans. The data items are transferred to the computers and subsequently transformed into formatted items. The formatted items include multiple constraints. Some constraints may provide Boolean true/false designations. Other constraints may provide variable costs. The computers also transform metadata items associated with the constraints into the formatted items. The formatted items are stored in a database in anticipation of a request for a given formatted item. The given formatted item may be read from the database. A geospatial data interchange format file is generated from the given formatted item. A visual presentation of the geospatial data interchange format file is created in a human-readable format and presented at an output device.

Figure 1:
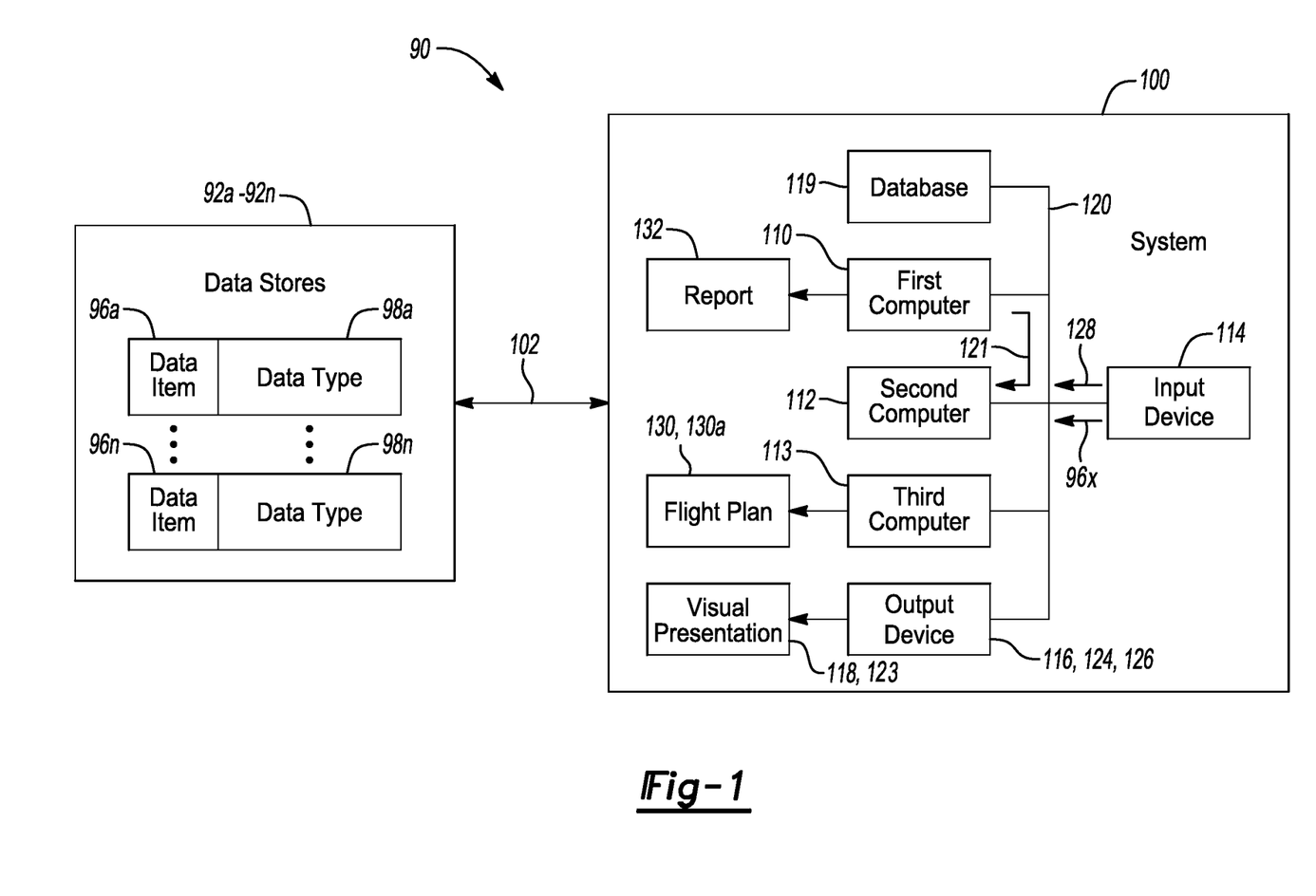
FIG. 1 is a schematic diagram of an environment for a flight constraints service in accordance with one or more exemplary embodiments.

Referring to FIG. 1, a schematic diagram of an example implementation of an environment 90 for a flight constraints service is shown in accordance with one or more exemplary embodiments. The environment 90 includes multiple data stores 92*a*-92*n* and a system 100. The data stores 92*a*-92*n* hold data items 96*a*-96*n* with corresponding data types 98*a*-98*n*. The system 100 includes a network 102, a first computer 110, a second computer 112, a third computer 113, an input device 114, an output device 116, a database 119 and a communication link 120. The output device 116 presents a visual presentation 118.

The data stores 92*a*-92*n* implement a variety of data storage systems. The data stores 92*a*-92*n* may be physically located in multiple facilities internal and/or external to the system 100. In various embodiments, the data stores 92a-92n are heterogenous relative to each other with varying architectures. The data stores 92a-92n contain the data items 96a-96n. The data items 96a-96n may include information such as operational data, maintenance data, customer data, location data, and the like. The data items 96a-96n are used to generate flight plans. The data types 98a-98n explain the kinds of information that the data items 96a-96n convey.

The system 100 implements a network of computers in communication with the data stores 92a-92n through the network 102. Nodes of the network communicate with each other through the communication link 120. The first computer 110 is operational to receive the data items 96a-96n, and transform the data items 96a-96n into formatted items. The formatted items include first constraints and second constraints. Each first constraint has one of a Boolean true designation and a Boolean false designation. Each second constraint is a variable cost that ranges from an avoidance cost to an inclusion cost. The first computer 110 may also transform metadata items associated with the constraints into the formatted items, store the formatted items in the database 119, generate a geospatial data interchange format file 121 from a requested formatted item, and transfer the geospatial data interchange format file 121 to the second computer 112. The first computer 110 also generates and presents a human-readable report 132 in response to a failure to transform a particular data item (e.g., 96n) into a particular formatted item. The second computer 112 is operational to send a request to the first computer 110 to view the requested formatted item, and create the visual presentation 118 of the geospatial data interchange format file 121. The output device 116 is operational to present the visual presentation 118 in a human-readable format 123. The third computer 113 is operational to receive a subset of the first constraints from the first computer 110, and generate a particular flight plan 130a among several flight plans 130 in response to the subset of the first constraints aside from the first constraints with the Boolean false designation.

The network 102 implements a wide-area communication network. The network 102 is operational to transfer information from the system 100 to the data stores 92a-92n, and from the data stores 92a-92n to the system 100. The network 102 may include one or more wired networks and/or one or more wireless networks. In various embodiments, the network 102 may include the Internet, a wide area network, a local area network, and the like.

The input device 114 implements a human machine interface device. The input device 114 is operational to receive a query and/or a manual data item 96x from a person (or user). The manual data items 96x are transferred via the communication link 120 to the first computer 110. Each query is transferred as a request 128 via the communication link 120 to the second computer 112.

The output device 116 implements a display 124, a printer 126, and/or similar device capable of rendering the visual presentation 118 in a human-readable format 123. The output device 116 is in communication with the second computer 112 via the communication link 120. The visual presentation 118 may be received by the output device 116 through the communication link 120.

The communication link 120 implements a local communication network. The communication link 120 is operational to transfer information among the first computer 110, the second computer 112, the third computer 113, the input device 114, the output device 116, and the database 119. In various embodiments, the communication link 120 may be a local area network, an Ethernet network, a set of point-to-point networks, a wireless network, or the like.

Figure 2:
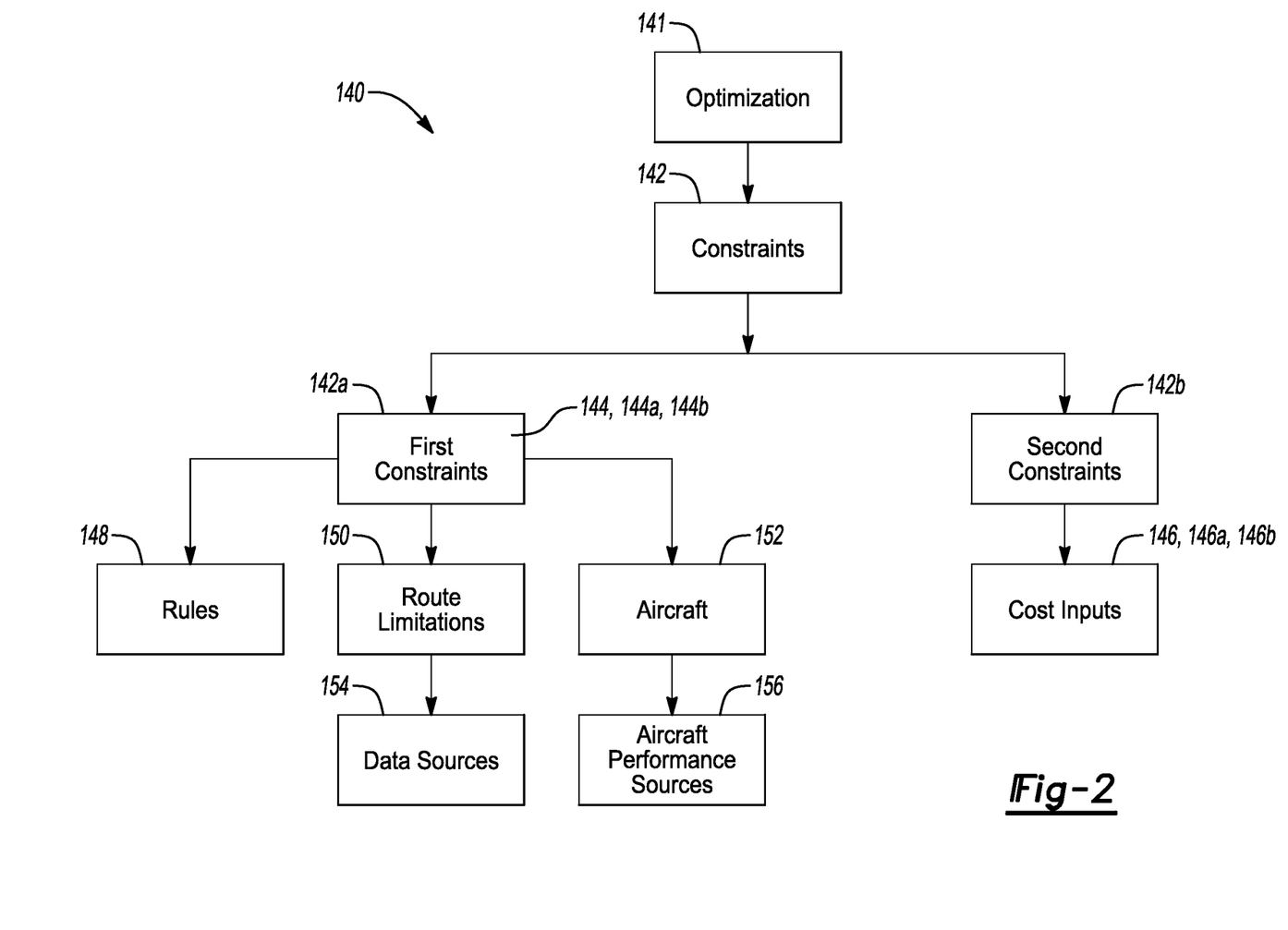
FIG. 2 is a schematic block diagram for data processing in accordance with one or more exemplary embodiments.

Referring to FIG. 2, a schematic block diagram 140 for data processing is shown in accordance with one or more exemplary embodiments. The blocks and relationships of the block diagram 140 are implemented in the system 100. The block diagram 140 generally includes elements 141 to 156, as illustrated. The sequence of elements is shown as a representative example. Other element orders may be implemented to meet the criteria of a particular application.

An optimization tool 141 provides initial data. The initial data is formed into constraints 142. A constraint 142 may be many different things. Typically, the constraints 142 within flight planning may be broken up into two categories, either first constraints 142a (e.g., obligatory constraints) or second constraints 142b (e.g., optional constraints). In other words, the first constraints 142a may be viewed as a restriction 144 that typically has a Boolean true designation 144a or a Boolean false designation 144b. The second constraints 142b may be considered based on a variable cost 146 to either avoid (e.g., an avoidance cost 146a) or execute (e.g., an inclusion cost 146b). The variable costs 146 are utilized in a variety of equations and may vary by priority from one airline to the next. The two categories of the constraints 142 may further be broken down in a variety of flight planning data sources. Because of the differences between the first constraints 142a and the second constraints 142b, the implementation and usage within the optimization 141 may vary since a restraint is a Boolean limitation while a cost is something to be weighted and subsequently calculated.

The first constraints 142a may be used to establish rules 148 associated with the customers. The first constraints 142a may also be used to establish route limitations 150 and aircraft limitations 152. The route limitations 150 are provided to data sources 154. The aircraft limitations 152 are provided to aircraft performance sources 156. The second constraints 142b may be used to establish inputs for the variable cost 146. The variable costs 146 generally includes the avoidance costs 146a and the inclusion costs 146b.

Figure 3:
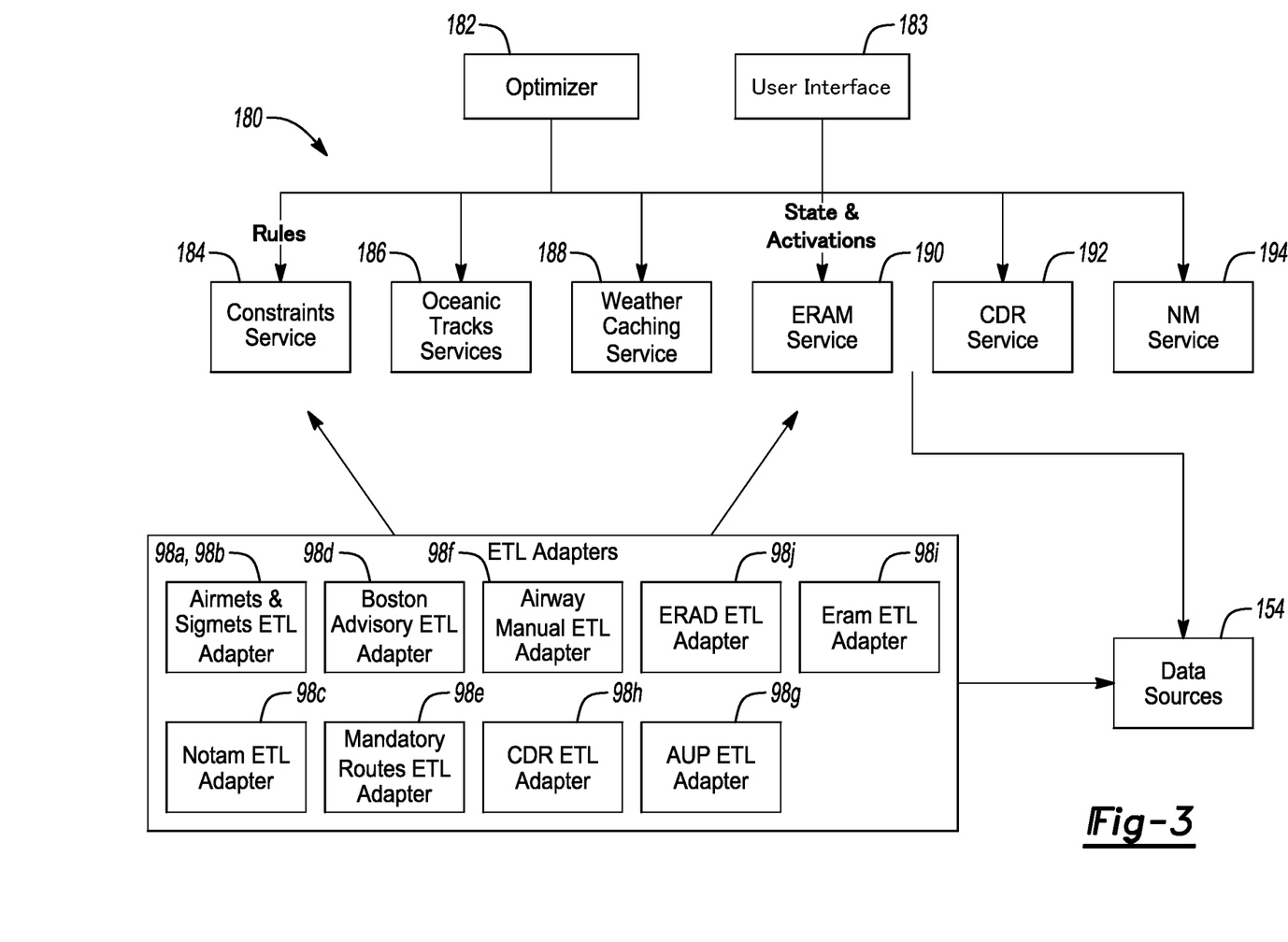
FIG. 3 is a schematic block diagram for a flight constraints service in accordance with one or more exemplary embodiments.

Referring to FIG. 3, a schematic block diagram 180 for a flight constraints service is shown in accordance with one or more exemplary embodiments. The blocks and relationships of the block diagram 180 are implemented in the system 100. The block diagram 180 generally includes the data types 98a-98n, the data sources 154, and elements 182 to 194, as illustrated. The sequence of elements is shown as a representative example. Other element orders may be implemented to meet the criteria of a particular application.

Current flight planning criteria include an ability to provide the constraints to an optimization service 182, as well as the ability for administrators (e.g., Jeppesen Administrators) to view and manage formatted items within user interfaces 183. A constraint service 184 may conform to a predetermined data distribution pattern. Other services may include oceanic tracks services 186, weather caching services 188, en route automation modernization (ERAM) services 190, coded departure route (CDR) services 192, and Eurocontrol network manager (NM) services 194.

Figure 4:
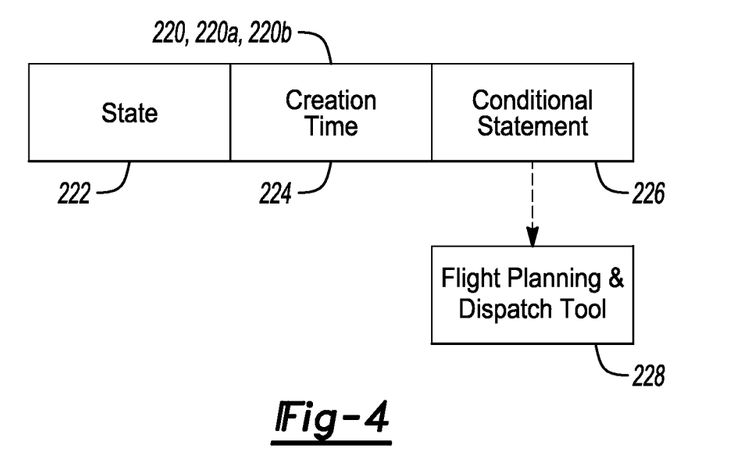
FIG. 4 is a schematic diagram of a formatted item in accordance with one or more exemplary embodiments.

Referring to FIG. 4, a schematic diagram of an example formatted item is shown in accordance with one or more exemplary embodiments. The formatted item 220 generally includes a state 222, a creation time 224 and a conditional statement 226. Additional items may be included in a formatted item 220 to meet the design criteria of a particular application.

Each formatted item 220 (e.g., a type of route availability document (RAD)) is a routing restriction that may be a series of items to be included or excluded with a specified condition that may be interpreted into a Boolean value. The formatted items 220 in the system 100 support instrument flight rules (IFR) flight planning. The formatted items 220 directly impact the route of a flight and/or the availability of a potential route.

The formatted items 220 are typically created for timeframes that are effective for a set number of hours or more. In cases where a formatted item 220 is relatively static, but the state 222 may change minute by minute, the formatted item 220 includes the conditional statement 226 that a downstream service may validate against the state of the data type 98a-98n (FIG. 1). Restrictions may be specified within the format of the formatted items 220. The formatted items 220 may be compatible with a Jeppesen flight planning and dispatch tool 228, or similar flight planning and dispatch tools.

Examples of data types 98a-98n that may be constructed into the formatted items 220 include, but are not limited to, airman's meteorological information (Airmets) 98a, significant meteorological hazards (Sigmets) 98b, notice to air missions (Notams) 98c, airport (e.g., Boston) advisories 98d, mandatory routes 98e, airway restrictions 98f, airspace use plan (AUP) data 98g, coded departure routes (CDR) 98h, en route automation modernization data (ERAM) 98i, and extended range aerial delivery system (ERAD) 98j. Examples of data types that may not be constructed into the formatted items 220 include, but are not limited to, winds aloft, aircraft performance, navigational data, fuel costs, optional routes and time costs.

While formatted items 220 are capable of including both the rules 148 and states 222 for the rules 148, such situations may be absent. In the case where a constraint 142 includes both a given state 222 and a rule 148, but is not changing in a timeseries of minutes, a constraint service may include both to provide a full data set to make a decision. In the case where a state 222 may change for a given rule 148 in a fast manner (e.g., minutes or less), but the rule 148 outside of the state 222 is relatively static, the constraint 142 may specify the condition and a reference for the state 222, and allow a client to retrieve the state 222 for the data type 98a-98n during runtime. The formatting generally enables clients to query certain data at runtime, and allowing for the constraints 142 to be viewable and managed within the user interface 183 (FIG. 3) within existing processes and data management teams.

Figure 5:
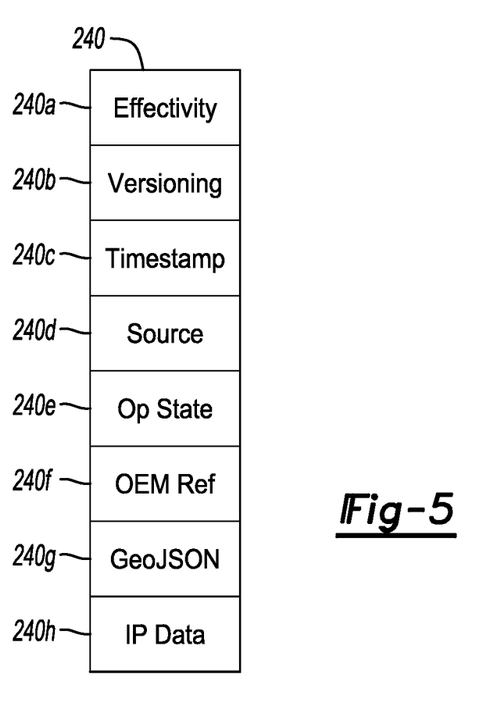
FIG. 5 is a schematic diagram of a metadata item in accordance with one or more exemplary embodiments.

Referring to FIG. 5, a schematic diagram of an example metadata item 240 is shown in accordance with one or more exemplary embodiments. The metadata item 240 may be transformed into a formatted item 220. The metadata item 240 generally includes two or more among effectivity data 240a, versioning data 240b, timestamp data 240c, source data 240d, operational state data 240e, original equipment manufacturer (OEM) reference data 240f, geoJSON (geospatial JavaScript Object Notation) data 240g, and IP data agreements 240h.

Figure 6:
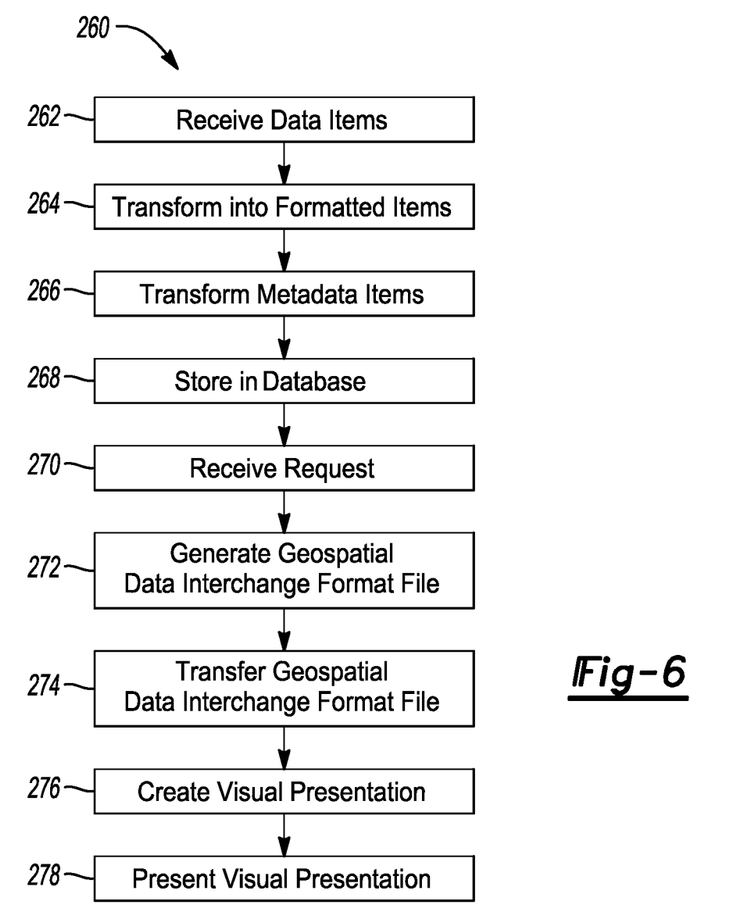
FIG. 6 is a flow diagram of a method for flight constraints service operations in accordance with one or more exemplary embodiments

Referring to FIG. 6, with reference to FIG. 1, a flow diagram of an example method 260 for flight constraints service operations is shown in accordance with one or more exemplary embodiments. The method (or process) 260 may be carried out by the system 100. The method 260 includes steps 262-278, as illustrated. The sequence of steps is shown as a representative example. Other step orders may be implemented to meet the criteria of a particular application.

In the step 262, the first computer 110 may receive the data items 96a-96n from the data stores 92a-92n. The first computer 110 transforms the data items 96a-96n into the formatted items 220 in the step 264. Metadata items 240 associated with the constraints 142 may be transformed by the first computer in the step 266 into the formatted items 220. Subsequently, the formatted items 220 are stored in the database 119 in the step 268.

In the step 270, the first computer 110 may receive a request 128 to view a requested formatted item 220a. The first computer 110 subsequently generates a geospatial data interchange format file 121 from the requested formatted item 220a in the step 272. The geospatial data interchange format file 121 is then transferred in the step 274 from the first computer 110 to the second computer 112. In the step 276, the second computer 112 may create a visual presentation 118 of the geospatial data interchange format file 121. The visual presentation 118 may be presented in the step 278 in a human-readable format 123 at the output device 116.

Figure 7:
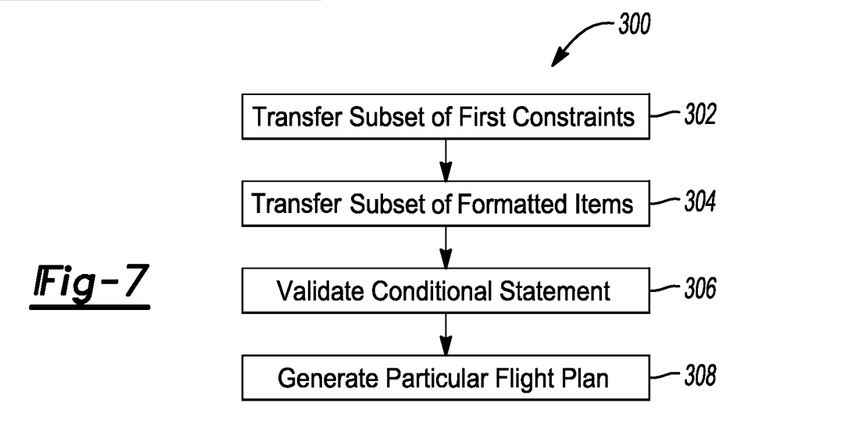
FIG. 7 is a flow diagram of a method for generating a flight plan in accordance with one or more exemplary embodiments.

Referring to FIG. 7, with reference to FIG. 1, a flow diagram of an example method 300 for generating a flight plan is shown in accordance with one or more exemplary embodiments. The method (or process) 300 may be carried out by the system 100. The method 300 includes steps 302-308, as illustrated. The sequence of steps is shown as a representative example. Other step orders may be implemented to meet the criteria of a particular application.

In the step 302, a subset of the first constraints 142a are transferred from the first computer 110 to the third computer 113. A subset of the formatted items 220 are transferred in the step 304 from the first computer 110 to the third computer 113. The third computer 113 validates the conditional statement 226 of each formatted item 220 in the subset against the state 222 and a corresponding data type 98a-98n in the step 306. In the step 308, the third computer 113 generates a particular flight plan 130a in response to the subset of the first constraints 142a aside from the first constraints 142a with the Boolean false designation 144b.

Figure 8:
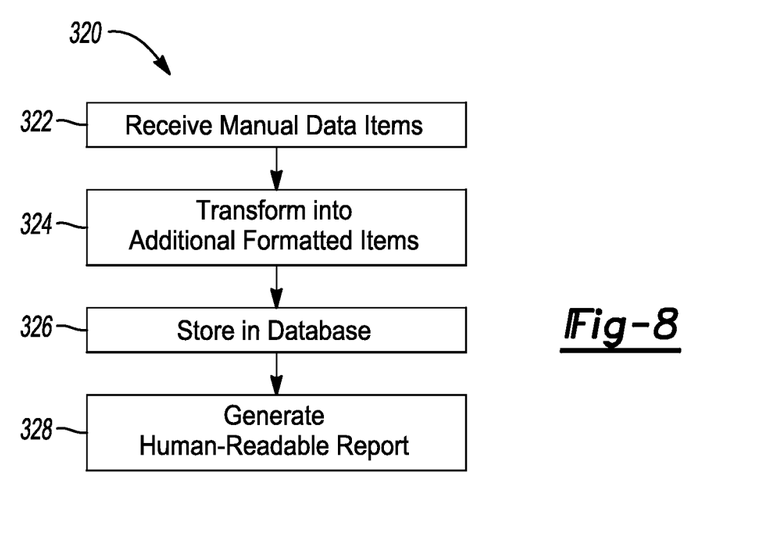
FIG. 8 is a flow diagram of a method for adding manual entries in accordance with one or more exemplary embodiments.

Referring to FIG. 8, with reference to FIG. 1, a flow diagram of an example method 320 for adding manual entries is shown in accordance with one or more exemplary embodiments. The method (or process) 320 may be carried out by the system 100. The method 320 includes steps 322-328, as illustrated. The sequence of steps is shown as a representative example. Other step orders may be implemented to meet the criteria of a particular application.

One or more manual data items 96x are received at the first computer 110 from the input device 114 in the step 322. In the step 324, the first computer 110 may transform the manual data items 96x into additional ones of the formatted items 220b. The additional formatted items 220b are stored in the database 119 in the step 326. In the step 328, the first computer 110 may generate a human-readable report 132 in response to a failure to transform a manual data item 96x (or the data items 96a-96n) into a formatted item 220.

Figure 9:
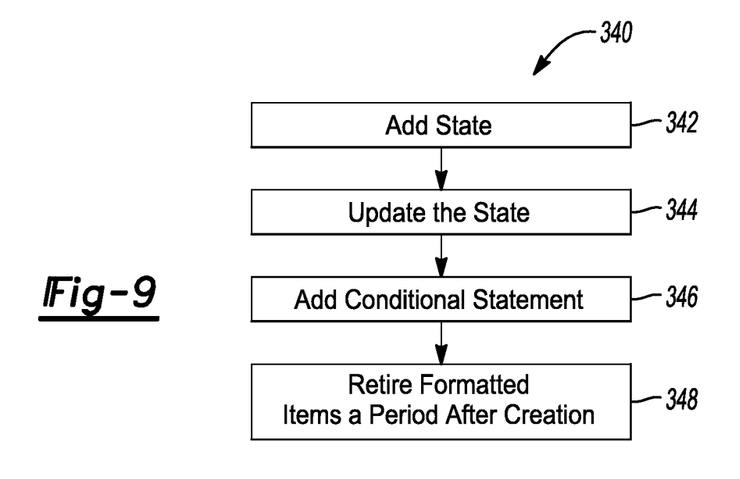
FIG. 9 is a flow diagram of a method for determining when to retire formatted items in accordance with one or more exemplary embodiments.

Referring to FIG. 9, with reference to FIG. 1, a flow diagram of an example method 340 for determining when to retire old, formatted items is shown in accordance with one or more exemplary embodiments. The method (or process) 340 may be carried out by the system 100. The method 340 includes steps 342-348, as illustrated. The sequence of steps is shown as a representative example. Other step orders may be implemented to meet the criteria of a particular application.

In the step 342, a state 222 may be added to each formatted item 220 at a corresponding creation time 224. The state 222 may be updated for one or more reasons in the step 344 prior to retirement. A conditional statement 226 is added in the step 346 to each of the formatted items 220 that is updated. In the step 348, each formatted item 220 may subsequently be retired a corresponding period after the creation time 224.

Figure 10:
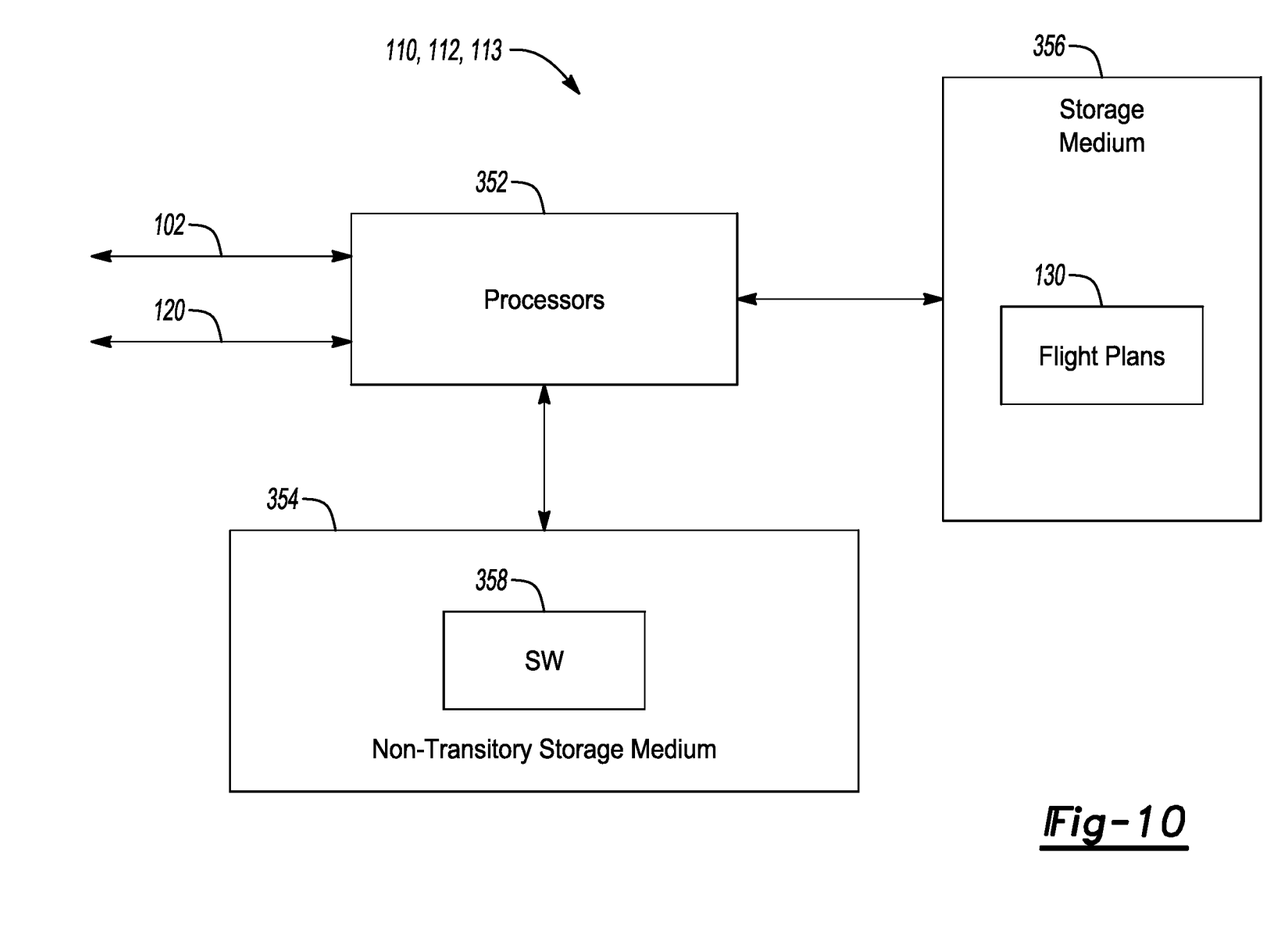
FIG. 10 is a schematic diagram of a computer in accordance with one or more exemplary embodiments.

Referring to FIG. 10, a schematic diagram of an example implementation of the first computer 110, the second computer 112, and the third computer 113 is shown in accordance with one or more exemplary embodiments. The first computer 110, the second computer 112, and the third computer 113 may include one or more processors 352, a non-transitory storage medium 354 and another storage medium 356. The processors 352 may communicate bi-directionally on the communication link 120. The processors 352 of the first computer 110 may also communicate bi-directionally via the network 102.

The non-transitory storage medium 354 may hold one or more instructions 358 (or software programs) executed by the processors 352 to perform the methods. The flight plans 130 once determined, generally reside in the storage medium 356.

The instructions 358 in the first computer 110 may be read and executed by the processors 352 to implement the process of generating the reports 132. The instructions 358 in the second computer 112 may be read and executed by the processors 352 to implement the process of generating the visual presentation 118. The instructions 358 in the third computer 113 may be read and executed by the processors 352 to implement the process of generating the flight plans 130.

By leveraging the formatted items 220, a flight planning & dispatch (FP & D) system may build out a constraint-based optimization service for optimized flight plans. The constraints service and formatted items 220 may be used as a mechanism to insert, manage, and maintain the constraints 142 within the flight planning & dispatch system. An ability for end users, as well as Jeppesen administrators, to utilize and see the constraints 142 generally helps a flight planning system to create valid and optimized flight plans that aid in the workflow for the flight planning product.

Flight constraint services may store and/or generate geoJSON format files to support visualization. The formatted items may be archived with modifications being traceable to date, time and source of the change and/or creation. Metadata may be stored for each formatted item, including but not limited to, effectivity, versioning, create and update timestamps, source, operational state, OEM reference, geoJSON, and IP data agreements. The flight constraint services generally provide deconfliction analysis by providing queries to associates.

This disclosure is susceptible of embodiments in many different forms. Representative embodiments of the disclosure are shown in the drawings and will herein be described in detail with the understanding that these embodiments are provided as an exemplification of the disclosed principles, not limitations of the broad aspects of the disclosure. To that extent, elements and limitations that are described, for example, in the Abstract, Background, Summary, and Detailed Description sections, but not explicitly set forth in the claims, should not be incorporated into the claims, singly or collectively, by implication, inference or otherwise.

For purposes of the present detailed description, unless specifically disclaimed, the singular includes the plural and vice versa. The words "and" and "or" shall be both conjunctive and disjunctive. The words "any" and "all" shall both mean "any and all", and the words "including," "containing," "comprising," "having," and the like shall each mean "including without limitation." Moreover, words of approximation such as "about," "almost," "substantially," "approximately," and "generally," may be used herein in the sense of "at, near, or nearly at," or "within 0-5% of," or "within acceptable manufacturing tolerances," or other logical combinations thereof. Referring to the drawings, wherein like reference numbers refer to like components.

The detailed description and the drawings or FIGS. are supportive and descriptive of the disclosure, but the scope of the disclosure is defined solely by the claims. While some of the best modes and other embodiments for carrying out the claimed disclosure have been described in detail, various alternative designs and embodiments exist for practicing the disclosure defined in the appended claims. Furthermore, the embodiments shown in the drawings or the characteristics of various embodiments mentioned in the present description are not necessarily to be understood as embodiments independent of each other. Rather, it is possible that each of the characteristics described in one of the examples of an embodiment may be combined with one or a plurality of other desired characteristics from other embodiments, resulting in other embodiments not described in words or by reference to the drawings. Accordingly, such other embodiments fall within the framework of the scope of the appended claims.

What is claimed is:

1. A method for flight constraints service, the method comprising:
   receiving at a first computer a plurality of data items, wherein the data items have a plurality of data types, and the data items are useful in generating a plurality of flight plans;
   transforming the data items into a plurality of formatted items, wherein:
      the formatted items include a plurality of constraints;
      the constraints include a plurality of first constraints and a plurality of second constraints;
      each of the first constraints has one of a Boolean true designation or a Boolean false designation; and
      each of the second constraints is a variable cost that ranges from an avoidance cost to an inclusion cost,
   wherein transforming the data items into the formatted items includes:
      adding a reference state to a first formatted item of the formatted items, the reference state added to the first formatted item at a creation time of the first formatted item; and
      adding a conditional statement to the first formatted item;
   storing the formatted items in a database in communication with the first computer;
   transferring at least a subset of the formatted items from the first computer to a second computer, the subset including the first formatted item;
   obtaining, via the second computer, an updated state of a first data type of the data types, the first data type associated with the first formatted item, the updated state determined subsequent to the creation time of the first formatted item;
   validating the conditional statement of the first formatted item, via the second computer, by comparing the reference state of the first formatted item to the updated state of the first data type; and
   generating a particular flight plan, via the second computer, based on the first constraints that have the Boolean true designation without using the first constraints that have the Boolean false designation.

2. The method according to claim 1, wherein the first constraints that have the Boolean false designation are not utilized to determine one or more of a route limitation or an aircraft limitation.

3. The method according to claim 1, further comprising retiring the first formatted item upon reaching an end of a corresponding period that starts at the creation time of the first formatted item.

4. The method according to claim 1, further comprising: generating a human-readable report in response to a failure to transform a particular data item of the plurality of data items into a particular formatted item of the plurality of formatted items.

5. The method according to claim 1, wherein the plurality of formatted items are compatible with a Jeppesen flight planning and dispatch tool.

6. A system comprising:
a first computer and a second computer communicatively connected to each other, the first computer configured to:
receive a plurality of data items, wherein the data items have a plurality of data types, and the data items are useful in generating a plurality of flight plans;
transform the data items into a plurality of formatted items, wherein:
the formatted items include a plurality of constraints;
the constraints include a plurality of first constraints and a plurality of second constraints;
each of the first constraints has one of a Boolean true designation or a Boolean false designation; and
each of the second constraints is a variable cost that ranges from an avoidance cost to an inclusion cost;
wherein the first computer is configured to transform the data items into the formatted items by:
adding a reference state to a first formatted item of the formatted items, the first computer configured to add the reference state to the first formatted item at a creation time of the first formatted item; and
adding a conditional statement to the first formatted item;
store the formatted items in a database in communication with the first computer; and
transfer at least a subset of the formatted items, including the first formatted item, to the second computer; and
wherein the second computer is configured to:
receive the subset of the formatted items;
obtain an updated state of a first data type of the data types, the first data type associated with the first formatted item, the second computer configured to determine the updated state subsequent to the creation time of the first formatted item;
validate the conditional statement of the first formatted item by comparing the reference state of the first formatted item to the updated state of the first data type; and
generate a particular flight plan based on the first constraints that have the Boolean true designation without using the first constraints that have the Boolean false designation.

7. The system according to claim 6, wherein the second computer is configured to determine one or more of a route limitation or an aircraft limitation for the particular flight plan without using the first constraints that have the Boolean false designation.

8. The system according to claim 6, wherein the first computer is further configured to:
retire the first formatted item upon reaching an end of a corresponding period that starts at the creation time of the first formatted item.

9. The system according to claim 6, wherein the first computer is further operational to:
generate a human-readable report in response to a failure to transform a particular data item of the plurality of data items into a particular formatted item of the plurality of data items.

10. The system according to claim 6, wherein the plurality of formatted items are compatible with a Jeppesen flight planning and dispatch tool.

11. The system according to claim 6, wherein the plurality of data types includes airman meteorological information, significant meteorological information, notice to air missions, airport advisories, mandatory routes, airway restrictions, airspace use plans, code departure routes, en route automation modernization, and extended range aerial delivery system.

12. The method of claim 1, further comprising transforming a plurality of metadata items associated with the plurality of constraints into the plurality of formatted items, wherein the metadata items include at least two of effectivity, versioning, timestamps, source, or operational state of the plurality of constraints.

13. The method of claim 1, further comprising:
receiving a request at the first computer to view a requested formatted item of the plurality of formatted items;
generating a geospatial data interchange format file from the requested formatted item;
transferring the geospatial data interchange format file from the first computer to a third computer;
creating a visual presentation of the geospatial data interchange format file with the third computer; and
presenting the visual presentation in a human-readable format at an output device in communication with the third computer.

14. The method of claim 1, wherein the conditional statement of the first formatted item is determined to be valid in response to determining, via the second computer, that the reference state of the first formatted item matches the updated state of the first data type.

15. The method of claim 14, wherein the particular flight plan is generated, via the second computer, based at least in part on the first formatted item in response to determining that the first formatted item is valid.

16. The method of claim 1, wherein the reference state is added to the first formatted item in response to determining that a state of the first data type may change during a time period that extends from the creation time of the first formatted item to a retirement time for the first formatted item.

17. The method of claim 1, wherein each formatted item in the plurality of formatted items is a type of route availability document (RAD).

18. The method of claim 1, wherein each formatted item in the plurality of formatted items includes a respective routing restriction that is a series of items to be one of included or excluded with a specified condition interpreted into a Boolean value.

* * * * *